United States Patent [19]

Kuwabara et al.

[11] Patent Number: 4,959,579
[45] Date of Patent: Sep. 25, 1990

[54] ULTRASONIC MOTOR

[75] Inventors: Yasuo Kuwabara; Naofumi Fujie, both of Nagoya; Takao Saeki, Chiryu, all of Japan

[73] Assignee: Aisin Seiki Kabushiki Kaisha, Kariya, Japan

[21] Appl. No.: 381,949

[22] Filed: Jul. 19, 1989

[30] Foreign Application Priority Data

Jul. 29, 1988 [JP] Japan ................................ 63-191951

[51] Int. Cl.$^5$ .......................................... H01L 41/08
[52] U.S. Cl. .................................................. 310/323
[58] Field of Search ................................ 310/323, 328

[56] References Cited

U.S. PATENT DOCUMENTS 4,736,129  4/1988  Endo et al. ........................... 310/323

FOREIGN PATENT DOCUMENTS 0247775  10/1987  Japan ................................. 310/323
63-73887  4/1988  Japan .

Primary Examiner—Mark O. Budd
Attorney, Agent, or Firm—Burns, Doane, Swecker & Mathis

[57] ABSTRACT

An ultrasonic motor comprises a stator, a rotor, a disc spring for generating a pressure between the stator and the rotor, and a stabilizer disc having a ring-shaped projection for distributing the pressure uniformly to the rotor along the circumference of the ring-shaped projection. Because of such uniform pressure distribution, greater output can be obtained.

13 Claims, 3 Drawing Sheets

ULTRASONIC MOTOR

BACKGROUND OF THE INVENTION

This invention relates to an ultrasonic motor which utilizes an ultrasonic vibration as a driving power source.

Japanese laid-open Pat. publication No. 63-73887 published on Apr. 4, 1988 discloses an ultrasonic motor which rotates a rotor by utilizing an ultrasonic vibration on a stator. In this type of the ultrasonic motor, a vibration energy on the stator is transmitted to the rotor frictionally in order to rotate the rotor. Desirably, the rotor should have a stable contact with the stator.

FIGS. 4 and 5 herein show a conventional ultrasonic motor. In this type of the ultrasonic motor, a pressure is maintained properly by a disc spring (53) in an effort to obtain a stable contact between the rotor (52) and the stator (51).

While the rotor (52) is rotating, there is applied to the rotor (52) an oscillating pressure with high frequency from the stator (51). Then the rotor (52) may vibrate with a normal component and a tangent component as shown in FIG. 5. At this time, the vibration on the rotor (52) has the same frequency as the vibration on the stator (51). As long as the vibration on the rotor (52) has the same frequency as the vibration on the stator (51), increases in amplitude of the latter are transmitted to the former, so that an output of the ultrasonic motor increases according to the increase in an electric power supplied to the stator (51).

However, it has been found that after the supplied electric power exceeds a certain threshold value, the output of the ultrasonic motor does not increase in accordance with increases in supplied electrical power. Under such condition, a principal vibration begins to be generated in the rotor (52), which is of a different frequency than that of the stator (51). The vibration of the rotor (52) which still has the same frequency as the vibration of the stator (51) is of less amplitude (i.e., less output) than the latter.

SUMMARY OF THE INVENTION

Accordingly, one of the objects of this invention is to obviate the above conventional drawbacks.

As a result of many experiments, the present inventors finally found out that the generation of a principal vibration can be minimized when the pressure between the stator (51) and rotor (52) is distributed more uniformly to the rotor (52). That is to say, when the pressure between the stator (51) and the rotor (52) is distributed more uniformly to the rotor (52), the above-described threshold value is raised. Hence, the output amplitude is increased in accordance with supplied electric power for higher values of the latter, whereby higher outputs can be obtained.

It is thus also an object of this invention to increase the above-described threshold value for supplied electric power.

Further, it is an object of this invention to transmit a uniform pressure between a stator and a rotor.

Furthermore, it is an object of this invention to prevent a principal vibration on a rotor from being generated.

To achieve the above objects, and in accordance with the principles of the invention as embodied and broadly described herein, the ultrasonic motor having a stator and a rotor comprises a disc spring for generating a pressure between the stator and the rotor and a stabilizer having a ring-shaped projection for distributing the pressure uniformly to the rotor.

BRIEF DESCRIPTION OF THE DRAWINGS

The accompanying drawings, which are incorporated in and constitute a part of the specification, illustrate an embodiment of the invention, and, together with the description, serve to explain the principles of the invention. Of the drawings.

DETAILED DESCRIPTION OF THE PREFERRED EMBODIMENT

Figure 1:
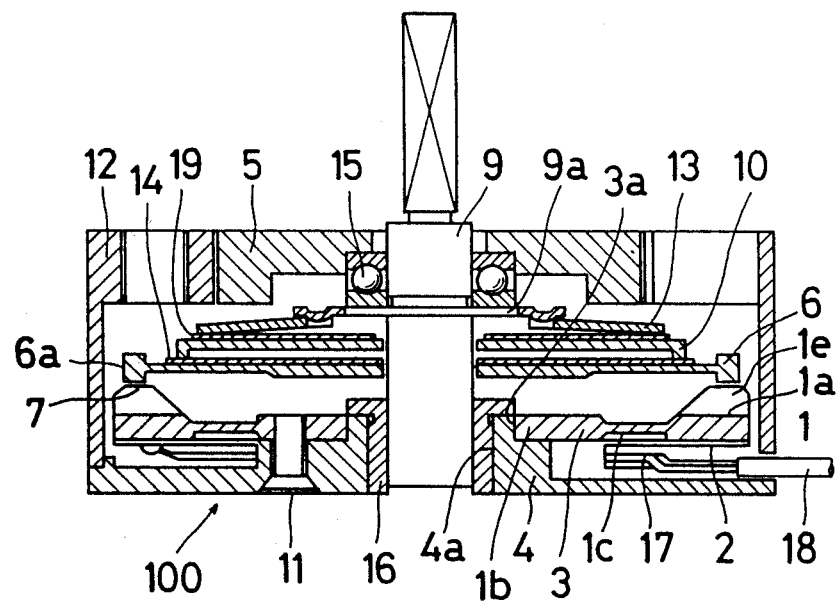
FIG. 1 is a cross-sectional view showing a preferred ultrasonic motor in accordance with this invention.

Reference will now be made in detail to the present preferred embodiment of the invention, an example of which is illustrated in the accompanying drawings. In accordance with the invention, an ultrasonic motor (100) having a stator (3) and a rotor (6) comprises a disc spring (13) for generating a pressure between the stator (3) and the rotor (6), and a stabilizer (10) having a ring shaped projection (10a) for distributing the pressure uniformly to the rotor (6).

Figure 2:
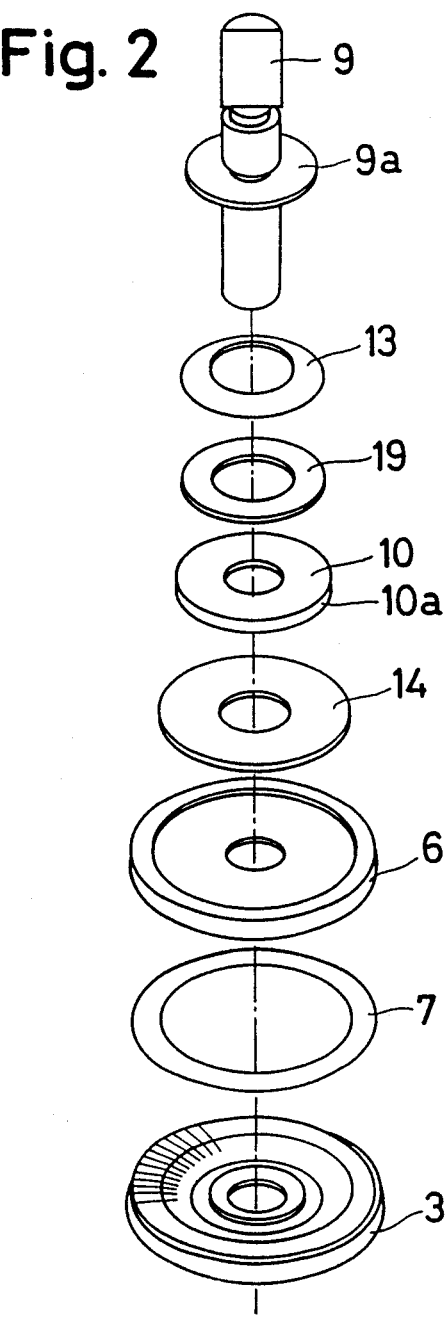
FIG. 2 is an exploded perspective view showing a main portion of a preferred ultrasonic motor in accordance with this invention.
Figure 4:
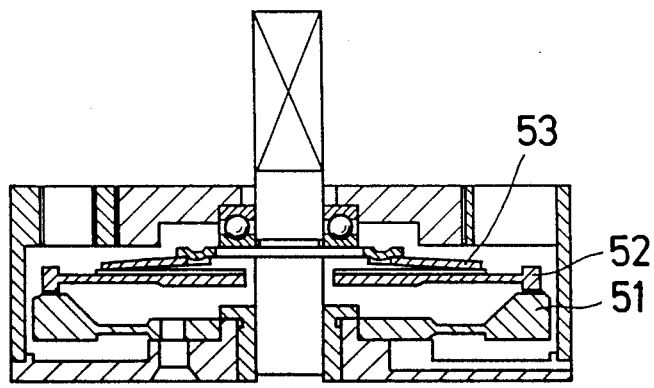
FIG. 4 is a cross-sectional view showing a conventional ultrasonic motor.
Figure 5:
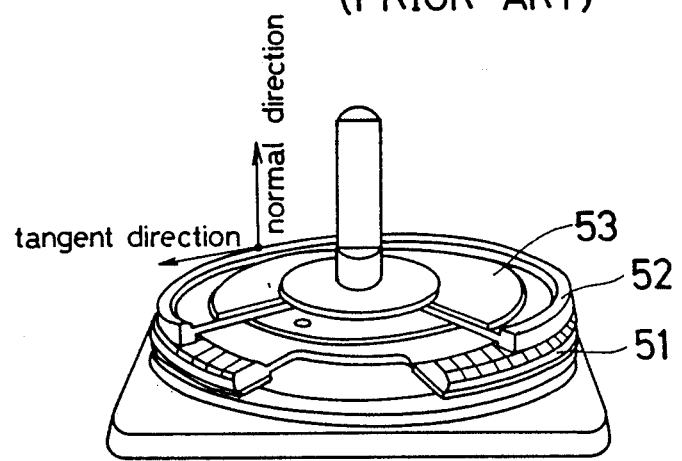
FIG. 5 is a perspective view showing a conventional ultrasonic motor.

Referring now to FIGS. 1 and 2, a mechanical construction is explained in detail.

A base member (4) has almost a disc shape. A central bore (4a) is formed at a center of the base member (4). A bearing (16) is pressed into the central bore (4a).

A central bore (3a) of the stator (3) is engaged with the base member (4). The stator (3) is fixed to the base (4) rigidly by screws (11). The stator (3) comprises a ring-shaped elastic member (1) and a ring-shaped piezoelectric element (2). The piezoelectric element (2) is adhered to the elastic member (1) by an electrically conductive adhesive.

The elastic member (1) further comprises an outer portion (1a), an inner portion (1b) and a thinner portion (1c) for integrally connecting the outer portion (1a) to the inner portion (1b). The elastic member (1) is supported by the base (4) because the inner portion (1b) is fixed to the base (4) by the screws (11). A plurality of equally pitched projections (1e) are formed on the outer portion (1a). The elastic member (1) is made of an electrically conductive alloy, for example, phosphor-bronze. Accordingly, the elastic member (1) is connected to the base member (4) electrically.

The piezoelectric element (2) is utilized for generating a traveling wave on the stator (3). The piezoelectric element (2) is of well known construction os that a detailed explanation for the piezoelectric element (2) is omitted from this specification. An electrode (17) is extended between the piezoelectric element (2) and the base member (4). The electrode (17) is electrically connected to the piezoelectric element (2). A conductive wire (18) is connected to the electrode (17). When A.C. voltage is fed between the conductive wire (18) and the base member (4), the traveling wave is generated on the elastic member (1) due to expansion and contraction of the piezoelectric member (2).

A tubular member (12) is fixed to the base member (4) by a screw thread connector. Further, a cover member (5) is fixed to the inner side of the tubular member (12). There is a screw thread connection between the tubular member (12) and the cover member (5). Thus, when cover member (5) is rotated, the cover member (5) travels along the axial direction of a shaft (9). Accordingly, a pressure between the stator (3) and the rotor (6) can be adjusted by rotating the cover member (5). The base member (4), the tubular member (12) and cover member (5) constitute a housing member which surrounds the ultrasonic motor (100).

A bearing member (15) is fixed to the cover member (5). The shaft (9) is rotatably supported by the bearing member (15) and the bearing (16). The bearing member (15) has a contact with a flange portion (9a) of the shaft (9). The bearing member (15) prevents the shaft (9) from traveling toward the cover member (5).

The rotor (6), a stabilizer (10), a disc spring (13) and some other members are inserted between the bearing member (15) and the elastic member (1). The rotor (6) and the stabilizer (10) are pressed toward the stator (3) by the disc spring (13).

The disc spring (13) is constrained by the flange portion (9a) of the shaft (9). Therefore, the flange portion (9a) prevents the disc spring (13) from traveling toward the cover member (5). Further, the flange portion (9a) supports the disc spring (13) coaxially with respect to the bearing member (15).

A rubber seat (14) is inserted between the rotor (6) and the stabilizer (10). The rubber seat (14) reduces the audible noise generated between the rotor (6) and the stabilizer (10) due to the vibration of the rotor (6). Further, another rubber seat (19) is inserted between the stabilizer (10) and the disc spring (13). The rubber seat (19) reduces the audible noise generated between the spring (13) and the stabilizer (10) due to the vibration of the rotor (6).

Figure 3:
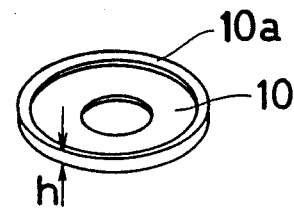
FIG. 3 is a perspective view showing a cylindrical member of a preferred ultrasonic motor in accordance with this invention.

FIG. 3 shows a shape of the stabilizer (10). The stabilizer (10) of this preferred embodiment is made of steel. Accordingly, the stabilizer (10) has a larger mass than the rotor (6) which is made of aluminum. The stabilizer (10) need not have the larger mass than the rotor (6) at all. However, if the mass of the stabilizer (10) is larger than the rotor (6), less vibration of the rotor (6) is less transmitted to the disc spring (13).

Further, it is preferable for the stabilizer (10) to be made of a highly stiff material because if the stabilizer (10) has a low stiffness, the vibration on the rotor (6) would be absorbed.

A ring-shaped projection (10a) is formed integrally on the outer circumference of the stabilizer (10). This projection (10a) is located radially inwardly from the contact area between the rotor (6) and the stator (3). The projection (10a) presses the rotor (6) via rubber seat (14) against the stator (3). The projection (10a) is of uniform height (h) in order to distribute the pressure uniformly around the circumference direction of the projection (10a).

An outer circumferential portion (6a) portion of the rotor (6) has a surface facing the outer portion (1a) of the elastic member (1). Further, a friction film (7) is inserted between both outer portions (6a) and (1a). The outer portion (6a) has a contact with the projections (1e) via friction film (7), because the rotor (6) is pressed toward the stator (3) via stabilizer (10).

While the A.C. power is fed between the conductive wire (18) and the base member (4), the traveling wave is generated on the stator (3) due to the vibration of the piezoelectric member (2). This traveling wave travels through the outer portion (1a) of the elastic member (1). At this time, the projections (1e) amplify an amplitude of the traveling wave. The traveling wave on the outer portion (1a) applies the rotational moment to the rotor (6), because the rotor (6) has the contact with the projections (1e) via the friction film (7). Thus, the rotor (6) and the shaft (9) are rotated.

While the rotor (6) is rotating, the rotor (6) is subjected to an oscillating pressure having a high frequency from the elastic member (1). Then the rotor (6) may vibrate in a normal direction and a tangent direction. At this time, the vibration on the rotor (6) has the same frequency as the vibration on the elastic member (1). As long as the rotor (6) vibrates with the same frequency as the elastic member (1), an increase in amplitude in the latter is transmitted to the former, so that an output of the ultrasonic motor (100) increases according to the increase in the electric power supplied to the piezoelectric element (2).

The vibration on the rotor (6) has its amplitude increased according to an increase in the electric power supplied to the piezoelectric element (2). In this embodiment, the stabilizer (10) distributes the pressure between the elastic member (1) and the rotor (6) uniformly along the circumference of the ring-shaped projection (10a). Therefore, when the electric power supplied to the piezoelectric element (2) increases extremely, a principle vibration is hardly generated on the rotor (6). Thus, a high output can be obtained from the ultrasonic motor (100) by supplying a large electric power to the piezoelectric element (2).

For example, an experiment was made using the rotor (6) having 80 (mm) diameter. The ultrasonic motor (100) with the stabilizer (10) was capable of generating 1.5 times the output of a conventional ultrasonic motor without the stabilizer (10).

Various modifications may be made in the invention without departing from the scope or spirit of the invention.

What is claimed is:

1. An ultransonic motor comprising:
   stator means for generating a traveling wave;
   rotor means operably engaged the stator means and driven by the traveling wave on the stator means;
   spring means for generating a pressure pressing the rotor means toward the stator means; and
   a stiff body disposed between said spring means and said rotor means for distributing the pressure from said spring means uniformly to the rotor means.

2. A motor according to claim 1 wherein the stabilizing means has a larger mass than the rotor means.

3. A motor according to claim 1 wherein the stabilizing means is stiffer than the rotor means.

4. A motor according to claim 1 wherein the stator means further comprises:
   a piezoelectric vibrating means for generating the traveling wave on the stator means; and
   an amplifying means for amplifying an amplitude of the traveling wave.

5. A motor according to claim 1 wherein the stabilizing means further comprises a disc having a ring-shaped projecting means operable engaging the rotor means.

6. A motor according to claim 5 wherein the projecting means operably engages a side of the rotor opposite a side thereof which operably engages the stator means.

7. A motor according to claim 1 wherein the stabilizer member is formed of steel.

8. A motor according to claim 1 wherein the stiff body has a larger mass than the rotor means.

9. A motor according to claim 1 wherein the stiff body is stiffer than the rotor means.

10. A motor according to claim 1 wherein the stiff body comprises a disc having a ring shaped projection operably engaging the rotor means along a circumference of the projection, the projection distributing the pressure to the rotor means uniformly around that circumference.

11. A motor according to claim 1, wherein said stabilizer member is formed of metal.

12. An ultrasonic motor comprising:

stator means for generating a traveling wave;
rotor means operably engaged the stator means and driven by the traveling wave on the stator means;
spring means for generating a pressure pressing the rotor means toward the stator means; and
stabilizing means for distributing the pressure uniformly to the rotor means, the stabilizing means comprising a stiff body interposed between the spring means and the rotor means, the stiff body comprising a disc having a ring shaped projection operably engaging the rotor means along a circumference of the projection, the projection distributing the pressure to the rotor means uniformly around that circumference.

13. A motor according to claim 12 including resilient means disposed between the projection and the rotor means.

* * * * *